United States Patent [19]

Hamatsu et al.

[11] Patent Number: 4,862,479
[45] Date of Patent: Aug. 29, 1989

[54] SPREAD SPECTRUM COMMUNICATION SYSTEM

[75] Inventors: Masahiro Hamatsu; Takao Kunihara, both of Tokyo, Japan

[73] Assignee: Clarion Co., Ltd., Tokyo, Japan

[21] Appl. No.: 107,378

[22] Filed: Oct. 9, 1987

[30] Foreign Application Priority Data

Oct. 24, 1986 [JP] Japan .................................. 61-253992

[51] Int. Cl.⁴ .............................................. H01L 9/00
[52] U.S. Cl. .......................................... 375/1; 380/34
[58] Field of Search ............................... 375/1; 380/34

[56] References Cited

U.S. PATENT DOCUMENTS 4,538,281 8/1985 Rajan ....................................... 375/1
4,689,626 8/1987 Hori et al. ............................... 375/1

Primary Examiner—Salvatore Cangialosi
Attorney, Agent, or Firm—Flynn, Thiel, Boutell & Tanis

[57] ABSTRACT

In a spread spectrum communication system, in which correlation output is obtained by giving a correlator a sender side output code and a receiver side output code, communication channels obtained by dividing the whole channel by using GOLD codes as the sender and receiver side output codes are used and the GOLD codes are constructed by adding preferred pairs of the two m sequences modulo 2.

2 Claims, 6 Drawing Sheets

SPREAD SPECTRUM COMMUNICATION SYSTEM

FIELD OF THE INVENTION

This invention relates to a spread spectrum communication (hereinbelow abbreviated to SSC) system permitting to obtain correlation output by means of a sender side output code and a receiver side output code.

BACKGROUND OF THE INVENTION

As conditions for the spreading code, which can be used in an SSC system, the followings can be enumerated:
  (i) that a large number of communication channels can be obtained;
  (ii) that the mutual correlation value between the codes is small;
  (iii) that the side lobe value of the self correlation value of the codes themselves is small;
and so forth. As a code satisfying such conditions the GOLD code generated by using preferred pairs of maximum length linearly occurring code sequences (hereinbelow abbreviated to m sequence) can be cited.

OBJECT OF THE INVENTION

However no example, in which the GOLD code stated above is applied as the spreading code in an SSC system using surface acoustic wave (hereinbelow abbreviated to SAW) convolvers, is known heretofore and in addition the correspondence relation between the communication channels obtained by dividing the whole channel by means of the GOLD code and the preferred pairs of the m sequences used for generating the GOLD code is not clearly known.

The object of this invention is to provide a method for obtaining the GOLD code used on the sender and receiver sides in an SSC system permitting to obtain means for dividing the communication channel, when the GOLD code stated above is used as the spreading code in an SSC system using SAW convolvers.

SUMMARY OF THE INVENTION

In order to achieve the object described above, an SSC system for obtaining a correlation output by the sender side output code and the receiver side output code according to this invention utilizes communication channels obtained by dividing the whole channel by means of the GOLD code as the sender and receiver side output codes.

The GOLD code stated above is constructed by adding preferred pairs of two m sequences modulo 2.

In a preferred form of realisation the sender side code described above is a spreading code obtained by using an set of GOLD codes generated from two m sequences $\{u, v\}$, which is represented by the following formula:

$$G(u,v) = \{u, v, u \oplus v, u \oplus Tv, \ldots, u \oplus T^{(N-1)}v\}$$

where
  T: state transition matrix of v
  N: code length of each sequence in G(u,v)
and the receiver side code is a spreading code obtained by using $$G(\bar{u},\bar{v}) = \{\bar{u}, \bar{v}, \bar{u} \oplus \bar{v}, \bar{u} \oplus T^{N-1}\bar{v}, \ldots, \bar{u} \oplus T\bar{v}\}$$

where $\bar{u}$ and $\bar{v}$ represent image codes of u and v, respectively (time-inverted m sequences of u and v, respectively).

In the m sequences having a code length $N(=2^\eta-1$, n being the number of stages of the shift register in the m sequence generator) the mutual correlation value $R_c$ takes the following three values. The pairs of codes are called preferred pairs of the m sequence, which have good correlation characteristics.

$$R_c = \begin{cases} t(n) - 2 \\ -1 \\ -t(n) \end{cases} \tag{1}$$

where t(n) is represented by;

$$t(n) = 1 + 2^{[(n+2)/2]} \tag{2}$$

where [ ] is a Gauss's symbol.

For example, among 18 m sequences of N = 127 there are 6 preferred pairs and $R_c$ is as follows;

$$R_c = \begin{cases} 15 \\ -1 \\ -17 \end{cases}$$

A sequence obtained by adding m sequences u and v modulo 2 is called a GOLD code G(u,v). This can be schematically represented as indicated in FIG. 2.

When the initial phase of the m sequences is taken into account, a set G(u,v) of GOLD codes produced by the two m sequences $\{u, v\}$ can be represented by the following equation (3);

$$G(u,v) = \{u, v, u \oplus v, u \oplus Tv, \ldots, u \oplus T^{N-1}v\} \tag{3}$$

where
  T: state transition matrix of v
  N: code length of each sequence in G(u,v)

In general, the number of sequences $\alpha$ contained in G(u,v) is given by $$\alpha = N + 2 = 2^\eta + 1 \tag{4}$$

For example, when N=127, $\alpha$=129.

$\{u, v\}$ in Eq. (3) are adopted as preferred pairs of the m sequence.

Now, supposing that two sequences y and z are $$y, z \in G(u,v), \tag{5}$$

the following properties are known.

(1) For $\forall$ l, the mutual correlation value of y and z $\theta_{y,z}(l)$ can be represented as follows;

$$\theta_{y,z}(l) = \begin{cases} t(n) - 2 \\ -1 \\ -t(n) \end{cases} \tag{6}$$

(2) The side lobe value $\theta_y(l)$ of the self correlation function is; for $\forall$ l$\neq$0 mod. N $$\theta_y(l) = \begin{cases} t(n) - 2 \\ -1 \\ -t(n) \end{cases} \quad (7)$$

That is, $\theta_{y,z}(l)$ and $\theta_y(l)$ are in accordance with $R_c$ given by Eq. (1) and consequently the set of the GOLD codes generated by preferred pairs of the m sequence show good correlation characteristics.

As explained above, it can be recognized that the GOLD codes are useful as spreading codes satisfying the conditions (i)~(iii).

That is, it is possible to assign each of the sequences in Eq. (3) u, v, u⊕v, ..., u⊕T$^{N-1}$v as one communication channel.

Now, in an SSC system using SAW convolvers a pair of sequences, which are in an image relation to each other, are necessary and thus, in the case where Eq. (3) is used as the sequence for the sender side, the sequence for the receiver side is as follows;

$$G(\bar{u},\bar{v}) = \{\bar{u},\bar{v},\bar{u}\oplus\bar{v},\bar{u}\oplus T^{N-1}\bar{v}, \ldots, \bar{u}\oplus T\bar{v}\} \quad (8)$$

where $\bar{u}$ and $\bar{v}$ are image codes of u and v, respectively. That is, the communication is effected by using corresponding sequences in { } in Eqs. (3) and (8).

DETAILED DESCRIPTION

Figure 1:
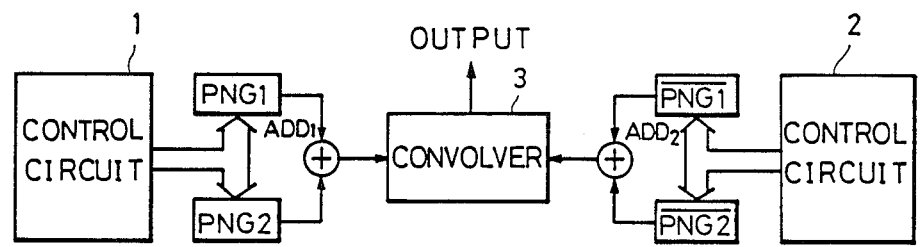
FIG. 1 is a block diagram illustrating the construction of an m sequence generator according to this invention used on the sender and receiver sides.
Figure 2:
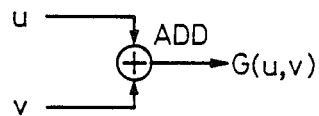
FIG. 2 is a scheme indicating the generation of an m sequence.

FIG. 1 illustrates the construction of a GOLD code generating portion used in the sender or the receiver and TABLE 1 shows an example of the communication channel division (in the case where the GOLD code length is 127).

TABLE 1

| Channel | Sender side output sequence | | Receiver side output sequence | |
|---|---|---|---|---|
| No. | PNG 1 | PNG 2 | $\overline{\text{PNG 1}}$ | $\overline{\text{PNG 2}}$ |
| 0 | u | L | $\bar{u}$ | L |
| 1 | L | v | L | $\bar{v}$ |
| 2 | u | v | $\bar{u}$ | $\bar{v}$ |
| 3 | u | Tv | $\bar{u}$ | $T^{126}\bar{v}$ |
| 4 | u | $T^2$v | $\bar{u}$ | $T^{125}\bar{v}$ |
| . | . | . | . | . |

TABLE 1-continued

| Channel | Sender side output sequence | | Receiver side output sequence | |
|---|---|---|---|---|
| No. | PNG 1 | PNG 2 | $\overline{\text{PNG 1}}$ | $\overline{\text{PNG 2}}$ |
| . | . | . | . | . |
| 128 | u | $T^{126}$v | $\bar{u}$ | $T\bar{v}$ | in which L means the low level.

In FIG. 1 PNG 1 and PNG 2 represent m sequence generators generating u and v, respectively, which are preferred pairs of the respective m sequences; $\overline{\text{PNG 1}}$ and $\overline{\text{PNG 2}}$ represent m sequence generators generating $\bar{u}$ and $\bar{v}$, which are image codes of u and v, respectively. A control circuit 1 controls the initial phase of the output codes of PNG 1 and PNG 2 and permits the generation of the GOLD code sequences as indicated by Eq. (3). Another control circuit 2 effects control operations for $\overline{\text{PNG 1}}$ and $\overline{\text{PNG 2}}$ as the control circuit 1 and permits the generation of the GOLD code sequences as indicated by Eq. (8). Reference numeral 3 indicates a convolver forming the correlation output and ADD 1 and ADD 2 modulo 2 adders. The left side portion with respect to the convolver 3 is the sender side GOLD code generating portion and the right side portion is the receiver side GOLD code generating portion.

Now an example of the method for controlling the initial phase of the output code of the m sequence generators by the control circuits 1 and 2 and a concrete example of the construction of the m sequence generators are explained below.

Figure 3:
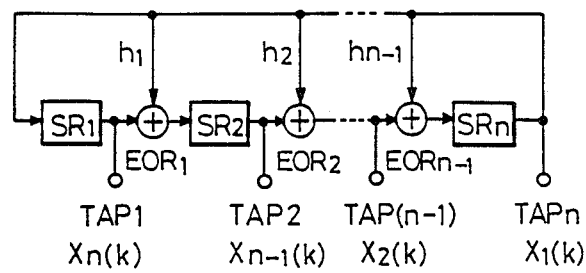
FIGS. 3 and 4 are block diagrams illustrating the principal construction of the modular type m sequence generator.
Figure 4:
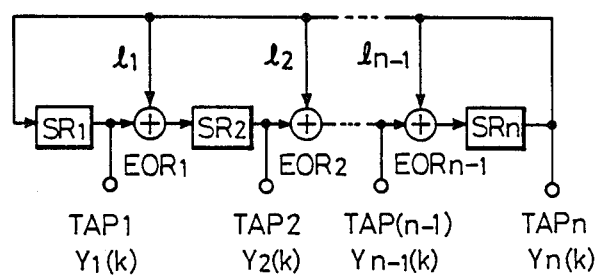
Figure 5:
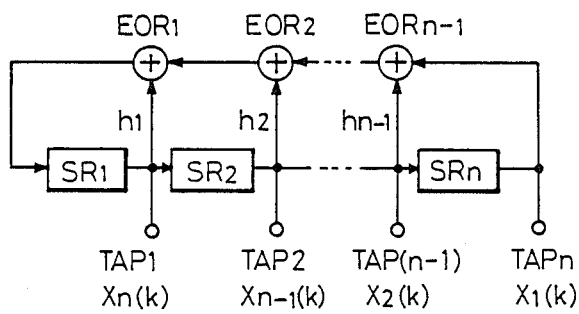
FIGS. 5 and 6 are block diagrams illustrating the construction of the simple construction type m sequence generator.
Figure 6:
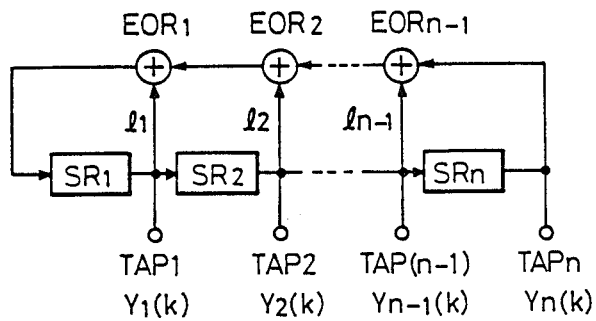

(a) Equation of state representing the initial state of shift registers constituting the m seuqence generator Models representing m sequence generators on the sender and the receiver sides, respectively, are indicated in FIGS. 3 to 6 for those of modular type (FIGS. 3 and 4) and for those of simple construction type (FIGS. 5 and 6). FIGS. 3 and 5 show the basic construction of the m sequence generator on the sender side and FIGS. 4 and 6 the same on the receiver side. In the figures, $SR_1 \sim SR_n$ represent flipflops; and $EOR_1 EOR_\eta$ exclusive OR gates. It is supposed that communication is performed between two devices having a same construction.

At this time the equation of state of the shift registers can be written with respect to the dispersion time k, as follows;

<On the sender side> for $k$ $$X(k+1) = AX(k), X(k) \neq 0 \quad (9)$$

<On the receiver side> for $k$ $$Y(k+1) = BX(k), Y(k) \neq 0 \quad (10)$$

where X(k) and Y(k) are given by the following equations;

$$X(k) = \begin{bmatrix} x_1(k) \\ \vdots \\ x_\eta(k) \end{bmatrix}, Y(k) = \begin{bmatrix} y_1(k) \\ \vdots \\ y_\eta(k) \end{bmatrix}$$

and A and B are in the case of the modular type $$A = \begin{bmatrix} h_{\eta-1} & & \\ \vdots & I_{\eta-1} & \\ h_1 & & \\ 1 & 0 \cdots 0 & \end{bmatrix},$$

$$B = \begin{bmatrix} 0 \cdots 0 & 1 \\ & l_1 \\ I_{\eta-1} & \vdots \\ & l_{\eta-1} \end{bmatrix},$$

in the case of the simple construction type $$A = \begin{bmatrix} 0 & & \\ \vdots & I_{\eta-1} & \\ 0 & & \\ 1 & h_{\eta-1} \cdots h_1 \end{bmatrix},$$

$$B = \begin{bmatrix} l_1 \cdots l_{\eta-1} & 1 \\ & 0 \\ I_{\eta-1} & \vdots \\ & 0 \end{bmatrix}.$$

In Eqs. (9) and (10), n represents the number of stages of the shift registers (hereinbelow abbreviated to SR); X(k) and Y(k) the state vector of the SR (n×1); A and B the state transition matrix of the SR (n×n); and $I_{\eta-1}$ is a unit matrix (n−1)×(n−1). Further $h_j$, $l_j$ (j=1, ..., n−1) indicate the state of the feedback line and feedbak "ON"→$h_j$, $l_j$=1, feedback "OFF"→$h_j$, $l_j$=0.

Furthermore A and B have the following properties;
(i)
$A^N = B^N = I_\eta$
N=$2^\eta$−1 (length of code sequence)
(ii)
$A^{-1} = B$, $B^{-1} = A$ (b) Expression of the m sequence (1 period long) outputted by $TAP_1$ Supposing that X(O) and Y(O) represent the initial state of the SR on the sender and the receiver sides, the sent and the received code patterns U and W, respectively, outputted by $TAP_i$ (i=1∼n) at k=0∼N−1 can be represented as follows:

<On the sender side>

$$U = \begin{bmatrix} c^T X(0) \\ c^T AX(0) \\ \vdots \\ c^T A^{N-1}X(0) \end{bmatrix} \begin{matrix} \leftarrow k = 0 \\ \leftarrow k = 1 \\ \vdots \\ \leftarrow k = N - 1 \end{matrix} \quad (11)$$

$c^T = [0 \ldots 0 \; 1 \; 0 \ldots 0]$
$\uparrow$
(n − i + 1)-th element

<On the receiver side>

$$W = \begin{bmatrix} d^T B^{N-1}Y(0) \\ \vdots \\ d^T BX(0) \\ d^T Y(0) \end{bmatrix} \begin{matrix} \leftarrow k = N - 1 \\ \vdots \\ \leftarrow k = 1 \\ \leftarrow k = 0 \end{matrix} \quad (12)$$

Figure 7:
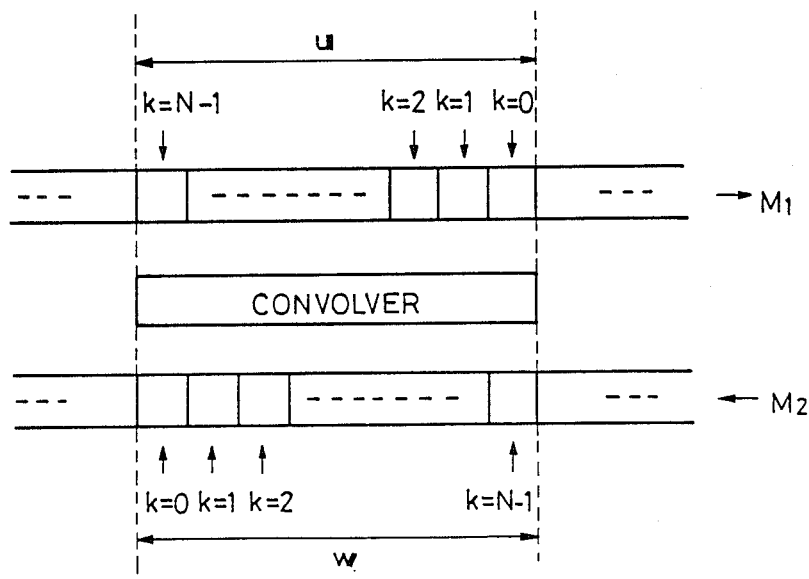
FIG. 7 is a scheme showing the phase relation between the sender and the receiver side m sequences.
Figure 8:
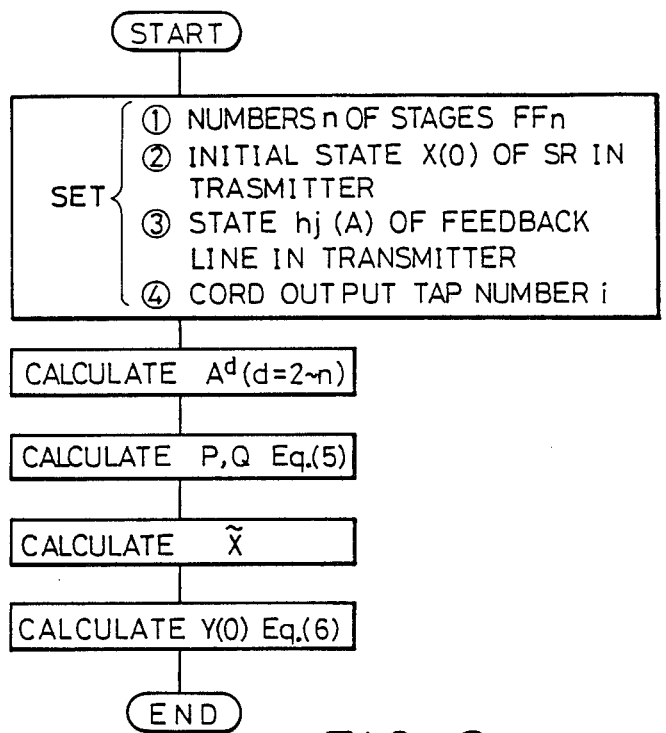
FIG. 8 is a flow chart indicating the process for obtaining the initial phase information in the m sequence generator.

$d^T = [0 \ldots 0 \; 1 \; 0 \ldots 0]$
$\uparrow$
i-th element (c) Deduction of Y(O)
In the case where the communication channel is divided by setting the phase relation of the sender and the receiver side m sequences $M_1$ and $M_2$ with respect to the convolver as indicated in FIG. 7, using U=W, $$PX(O) = QY(O) \quad (13)$$

where $$P = \begin{bmatrix} (n - i + 1)\text{-th line of } I_\eta \\ (n - i + 1)\text{-th line of } A \\ \vdots \\ (n - i + 1)\text{-th line of } A^{\eta-1} \end{bmatrix},$$

$$Q = \begin{bmatrix} i\text{-th line of } A \\ i\text{-th line of } A^2 \\ \vdots \\ i\text{-th line of } A^\eta \end{bmatrix} = \begin{bmatrix} q_{11} & \cdots & q_{1\eta} \\ \vdots & & \vdots \\ q_{\eta 1} & \cdots & q_{\eta\eta} \end{bmatrix}$$

are valid and Y(O) can be obtained analytically, as indicated by Eq. (14) by using Cramer's formula.

$$y_j(0) = \begin{vmatrix} q_{11} & & q_{1\eta} \\ \vdots & & \vdots \\ & \ldots X \ldots & \\ \vdots & & \vdots \\ q_{\eta 1} & & q_{\eta\eta} \end{vmatrix}, \quad (14)$$
$\uparrow$
j-th row where $y_j(O)$ is the j-th element of Y(O) and $\tilde{X} = PX(O).$ As explained above, the procedure for obtaining Y(O) can be summarized as indicated in FIG. 8.

Furthermore the calculations of the exponential of the matrix A in FIG. 8 can be performed by using the following Eqs. (15) and (16) in the case of the modular type m sequence generator.

Calculation algorithm of $A^d <I>$ used in the case of $d \leq N/2$ (i) For the 2nd~n-th rows of $A^d$ the 1st~(n−1)-th rows are shifted as they are.

(ii) The 1st row of $A^{d-1}$ can be obtained by the following calculation.

$$(\text{n-th row of } A^{d-1}) \oplus \sum_{j=1}^{\eta-1} h_{\eta-j} (\text{j-th row of } A^{d-1}) \quad (15)$$

where $d = 2 \sim N - 1 (\because N = 2^\eta - 1)$

Calculation algorithm of $A^d <II<$ used in the case of $d > N/2$ (i) For the 1st~(n−1)-th rows of $B^r(=A^d)$ the 2nd~n-th rows are shifted as they are.

(ii) The n-th row of $B^r(=A^d)$ can be obtained by the following calculation.

$$(\text{1st row of } B^{r-1}) \oplus \sum_{j=2}^{\eta-1} l_{j-1}(\text{j-th row of } B^{r-1}) \quad (16)$$

where $r = 1 \sim N - 2, r = N - d.$

Figure 10:
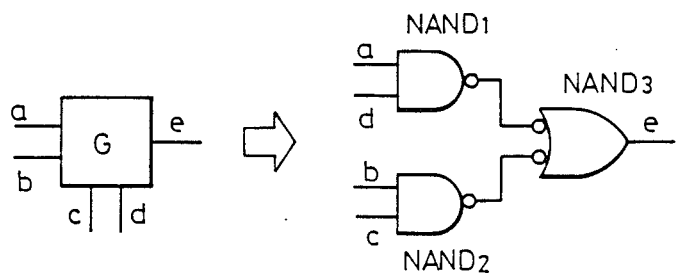
FIG. 10 indicates a switching gate circuit.
Figure 9:
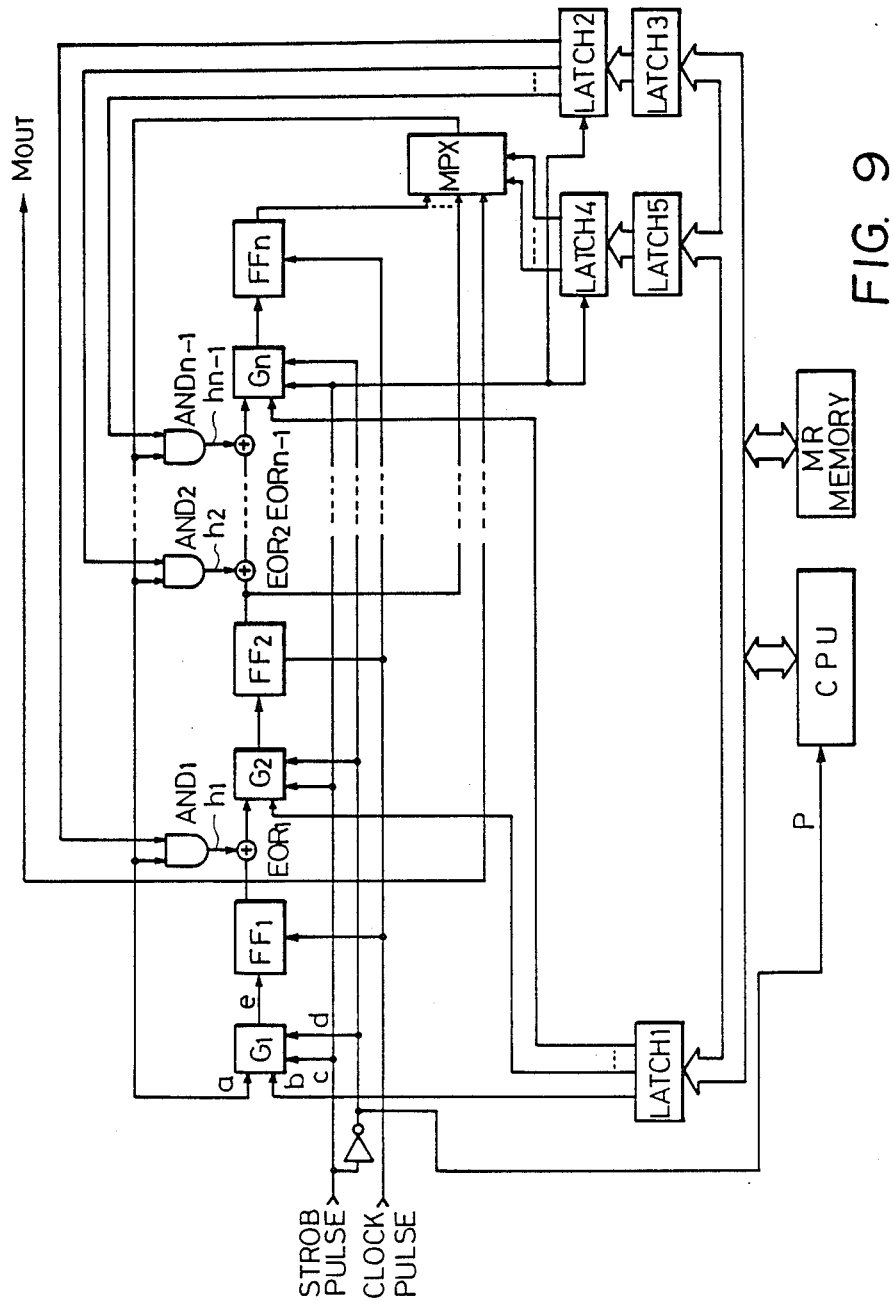
FIG. 9 is a block diagram showing a concrete example of the m sequence generator and the control circuit therefore.

FIG. 9 is a block diagram illustrating an example of the construction of the modular type m sequence generator used in the SSC system according to this invention, in which G represents a switching gate circuit, which can be constructed e.g. by using NAND gates $NAND_1$~$NAND_3$ as indicated in FIG. 10. In FIG. 9 LATCH 1~LATCH 5 are latch circuits; MPX is a multiplexer; CPU is a microprocessor; MR is a memory; and INV is an inverter circuit.

Now it is supposed that a code 1 is outputted from the output terminal of the m sequence. At this time, when a strobe pulse 1 is inputted, the circuit works as follows.

The content of the LATCH 1 is set at the input stage of flipflops $FF_1$~$FF_\eta$ through the gate circuit G. These data appear at the output stage of the flipflops by the rising edge $T_1$ of a clock pulse. The content of LATCH 1 is the initial state of the flipflops $FF_1$~$FF_\eta$.

Figure 11:
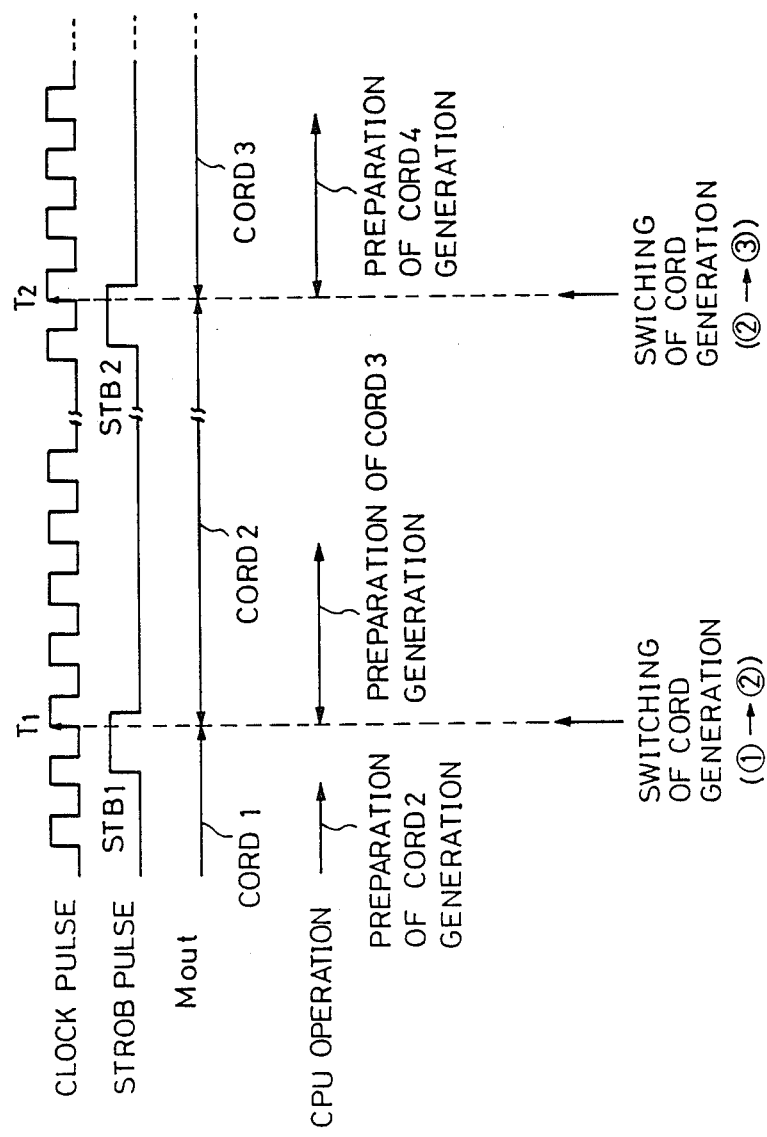
FIG. 11 is a timing chart for the code generator.

The content of LATCH 3 is outputted from LATCH 2 and the AND gate's $AND_1$~$AND_\eta$ are controlled. Further the content of $LATCH_5$ is outputted from $LATCH_4$ and the last stage of the flipflops is selected. As the result, a state is realized, where feedback lines $h_1$~$h_{\eta-1}$ can generate an m sequence CORD 2 indicated in FIG. 11.

As the result, CORD 2 is newly outputted from the output terminal $M_{out}$ of the m sequence by another clock pulse after $T_1$. That is, the output of the m sequence is changed from CORD 1 to CORD 2.

On the other hand, the strobe pulse STB 1 is used also as an interrupting pulse P to the microprocessor CPU and the microprocessor CPU prepares the generation of CORD 3, which is to be generated succeedingly, using the interrupting pulse P as a trigger. That is, the initial state of the flipflops $FF_1$~$FF_\eta$, the state of the AND gates and the selection state of the last stage of the flipflops are set at LATCH 1, LATCH 3 and LATCH 5.

Also when a strobe pulse STB 2 is inputted, the code output is changed from CORD 2 to CORD 3 by an operation similar to that described above.

It is clear from the above description that LATCH 1~5, the microprocessor CPU, the memory MR, etc. correspond to the control circuits 1 and 2 described previously.

As explained above, according to the invention, it is possible to divide the communication channel by using the GOLD code, which is excellent in the correlation characteristics.

While particular embodiments of the invention have been shown and described, it will be obvious to those skilled in the art that various changes and modifications may be made without departing from the present invention in its broader aspect.

The embodiments of the invention in which an exclusive property or privilege is claimed are defined as follows:

1. A GOLD code generating system used in a spread spectrum communication system, in which a correlation output is obtained by giving a correlator a sender side output code and a receiver side output code, comprising:
   means for generating a first m sequence u and a second m sequence v at the sender side;
   sender side control means for generating a sender side GOLD code which is a spreading code and which is an element of a set of GOLD codes G(u,v) where $G(U,v) = \{u, v, u \oplus v, u \oplus Tv, \ldots, u \oplus T^{N-1}v\}$ and where
   T: state transition matrix of v
   N: code length of each sequence in G(u,v);
   means for generating image codes $\bar{u}$ and $\bar{v}$ of said first and second m sequences at the receiver side; and
   receiver side control means for generating a receiver side GOLD code which is a spreading code and which is an element of a set of GOLD codes $G(\bar{u},\bar{v})$ where $G(\bar{u},\bar{v}) = \{\bar{u}, \bar{v}, \bar{u} \oplus \bar{v}, \bar{u} \oplus T^{N-1}\bar{v}, \ldots, \bar{u} \oplus T\bar{v}\}.$ 2. A system according to claim 1, including a surface acoustic wave convolver which is said correlator and has two inputs to which are respectively applied said sender side GOLD code and said receiver side GOLD code.

* * * * *

UNITED STATES PATENT AND TRADEMARK OFFICE
CERTIFICATE OF CORRECTION

PATENT NO. : 4 862 479
DATED : August 29, 1989
INVENTOR(S) : Masahiro HAMATSU et al It is certified that error appears in the above-identified patent and that said Letters Patent is hereby corrected as shown below:

On the first page of the patent document, please change the second inventor's name from "Takao Kunihara" to ---Takao Kurihara---.

Column 8, line 42; change "G(U,v)" to ---G(u,v)---.

Column 8, line 47; change "$\bar{v}$of" to ---$\bar{v}$ of---.

Signed and Sealed this

Sixteenth Day of October, 1990

*Attest:*

HARRY F. MANBECK, JR.

*Attesting Officer*     *Commissioner of Patents and Trademarks*